United States Patent Office 3,453,193
Patented July 1, 1969

3,453,193
IONIZING RADIATION INDUCED ADDITION OF TRICHLOROSILANE TO ALLYL CHLORIDE
Forrest O. Stark, John A. Valicenti, and George E. Vogel, Midland, Mich., assignors to Dow Corning Corporation, Midland, Mich., a corporation of Michigan
No Drawing. Filed Nov. 21, 1966, Ser. No. 595,656
Int. Cl. B01j 1/10
U.S. Cl. 204—158                                 6 Claims

ABSTRACT OF THE DISCLOSURE

A method for producing significantly improved yields of 3-chloropropyltrichlorosilane by mixing trichlorosilane and allyl chloride in specific mole ratios and subsequently heating within a particular temperature range and subjecting the mixture to a regulated dosage of ionizing radiation.

---

This invention relates to a method of preparing 3-chloropropyltrichlorosilane. More particularly, this invention relates to a method of preparing 3-chloropropyltrichlorosilane by the ionizing radiation induced addition of trichlorosilane to allyl chloride.

Although 3-chloropropyltrichlorosilane has been prepared by other methods in the prior art, such as by platinum addition of trichlorosilane to allyl chloride, numerous problems exist when attempting to employ these methods for commercial production. A major and objectionable problem of using the platinum method is that the trichlorosilane cannot be economically recovered from the platinum residues. In order to economically produce 3-chloropropyltrichlorosilane, the trichlorosilane should necessarily be recoverable and re-useable in the process. In addition, the platinum method is a batch process and the process should be a continuous one for obvious economical reasons.

Little has been done concerning the use of ionizing radiation as a catalyst for the addition of silanes to olefins. The addition of trichlorosilane to allyl chloride by ionizing radiation has been reported to some extent by A. M. El-Abbady and L. C. Anderson, J. Am. Chem. Soc., 80, 1737 (1958), however the adduct yields were of such low magnitude concomitant with high dosages of radiation that subsequent investigation of the matter was, in all likelihood, discouraged to a substantial degree. For example, the above publication reported a 40 percent yield of monoadduct after subjecting a 3:1 silane to olefin mixture to 50 megarads at a rate of 0.81 megarads/hour of ionizing radiation at room temperature.

In accordance with the above, it is an object of the present invention to provide a method which results in significantly improved yields of 3-chloropropyltrichlorosilane.

It is also an object of this invention to provide an economical method of producing 3-chloropropyltrichlorosilane, such that the trichlorosilane is recoverable and re-useable, so that the trichlorosilane can be recycled in a continuous process in the production of substantial yields of 3-chloropropyltrichlorosilane.

Other objects and many of the attendant advantages of this invention will be readily appreciated as the same becomes better understood by reference to the following detailed description.

This invention relates to a method of preparing 3-chloropropyltrichlorosilane comprising (A) mixing trichlorosilane and allyl chloride in a mole ratio of from 4:1 to 10:1, (B) heating said mixture to a temperature of from 110° C. to 160° C., and (C) radiating said mixture with ionizing radiation to induce a dosage of from 0.5 to 1.75 megarads.

The trichlorosilane and allyl chloride are suitably mixed by any feasible method that efficiently excludes free radical acceptors which may be harmful, especially oxygen. One of the best methods of mixing the two ingredients is to evacuate the appropriate container to a very low pressure, e.g., 0.1 to 5.0 microns of Hg and then vacuum distill the trichlorosilane into the container. The allyl chloride is then introduced and the mixture is heated simultaneously with or prior to being subjected to the ionizing radiation. An alternative method of mixing is to purge the container with helium, nitrogen, or some other inert gas until the container is substantially free of oxygen and then the desired quantities of trichlorosilane and allyl chloride can be added. The necessary reactants can be mixed in any suitable container which will not preferentially react with any of the reactants, products, or intermediate free radicals. Illustrative of containers which can be satisfactorily employed in the present invention include containers made from Pyrex glass, glass-lined steel, Hastelloy B, stainless steel, or nickel, among others.

The molar ratio of trichlorosilane to allyl chloride is critical in that there must be at least 4 moles of trichlorosilane per mole of allyl chloride. The range of molar ratios of trichlorosilane to allyl chloride which are economically operative are 4:1 to 10:1, however for best results, a molar ratio of from 4:1 to 6:1 is to be preferred, and particularly a molar ratio of 4:1.

After the trichlorosilane and allyl chloride are mixed in the selected container, the mixture is heated to a temperature of from 110° C. to 160° C. The temperature range related above is particularly critical to the present invention. Temperatures lower than 110° C. produce high proportions of telomer compared to the proportion of 3-chloropropyltrichlorosilane produced. Hence, in view of the above, no economical advantages are derived in operating at temperatures below 110° C. Temperatures beyond 160° C. are also inoperative since the product decomposes above this temperature. To obtain maximum yields of 3-chloropropyltrichlorosilane it has been found that a temperature range of from 130° C. to 140° C., preferably at about 135° C., appears to provide the most significant results.

When the mixture of trichlorosilane and allyl chloride has been heated to the desired temperature, the mixture is subjected to ionizing radiation. Any effective source of ionizing radiation appears to be perfectly suitable. Thus, one can employ a high energy electron accelerator of the Van deGraff type. A commercially available model has a 2,000,000 electron volt (2 mev.) capacity; market have about 100,000 electron volt capacity. Other suitable sources of ionizing radiation for the purposes of the present invention include X-ray or gammairradiation, e.g., from $Co^{60}$.

The amount of radiation required to obtain optimum yields of 3-chloropropyltrichlorosilane is also critical and must be within a range of from 0.5 to 1.75 megarads. Accordingly, it has been found that the preferred range is approximately 1.0 magarads. The dosage rate at which the ionizing radiation is applied is not critical, therefore the rate can extend from a period of a few minutes to many hours absent deleterious results, however, it has been found that lower dosage rates tend to provide greater yields. The term "megarads" as employed herein, refers to a dose of ionizing radiation which produces an energy absorption of $100 \times 10^6$ ergs per gram of irradiated substance. The term "magarad" has now replaced the term "megarep" which later term represents the quantity of ionizing radiation which produces energy absorption of $83 \times 10^6$ ergs per gram of tissue; thus, 1 mergarep=.83 mergard, or 1 megarad=1.2 megareps (approximately).

It is of importance to note that dosages lower than 0.5 megarads tend to produce a lower conversion of the allyl chloride to the desired product. Conversely, dosages higher than 1.75 megarads do not sufficiently increase the yields of 3-chloropropyltrichlorosilane with respect to either practical or commercial considerations.

The process of the invention is particularly useful for producing 3-chloropropyltrichlorosilane. The yield of 3-chloropropyltrichlorosilane is from 55 to 85 mol per cent based on the initial moles of allyl chloride used. The amount of telomers formed are extremely low and was completely unexpected in view of the prior art. As opposed to previous practice, far greater yields of the desired product are possible by using considerably less ionizing radiation than was heretofore suggested. Varying the process conditions without the limits set forth above substantially decreases the yield of 3-chloropropyltrichlorosilane and proportionately increases the amount of by-products in the product mixture.

The process of this invention is particularly useful in that the product and by-products can readily be fractionated from the allyl chloride. The trichlorosilane can be recycled, thus further reducing the cost of production and providing an economical method for producing 3-chloropropyltrichlorosilane. The ease with which the trichlorosilane can be separated from the product and by-products provides an advantageous requirement for a continuous process.

The process defined herein is remarkably efficient. The efficiency of a reaction conducted by radiation is frequently measured by a G value which is defined as the number of molecules changed per 100 e.v. in the form of ionizing energy in the trichlorosilaneallyl chloride mixture. G values determined for the amount of 3-chloropropyltrichlorosilane formed instead of the amount of allyl chloride converted is about 500 to 1000 for the process of this invention. In fact when ultradry reactants and glassware are employed, G values of up to 2000 were obtained.

The product, 3-chloropropyltrichlorosilane, is well known by those skilled in the art and can be used in accordance with known uses.

The following examples are illustrative only and should not be construed as limiting the invention which is properly delineated in the appended claims.

Example 1

0.57 gram of allyl chloroide and 3.97 grams of trichlorosilane were placed in a 20 cc. heavy-walled glass tube. The mixture was then heated to 135° C. and subjected to 1.53 megarads of Co-60 gamma radiation at a dosage rate of 1.68 megarads per hour. Vapor phase chromatograph and mass spectrometer analysis indicated an 88.7 percent conversion of allyl chloride yielding 78.0 percent 3-chloropropyltrichlorosilane, 2.0 percent allyl trichlorosilane, and 8.7 percent 1,3-bis-trichlorosilyl propane. The G value (3-chloropropyltrichlorosilane) for this reaction was 805.

Example 2

0.56 gram of allyl chloride and 4.08 grams of trichlorosilane were placed in a 20 cc. heavy-walled glass tube. The mixture was then heated at 135° C. and subjected to 1.36 megarads of Co-60 gamma radiation at a dosage rate of 0.168 megarads per hour. Vapor phase chromatograph and mass spectrometer analysis indicated a 95.6 percent conversion of allyl chloride yielding 81.0 percent 3-chloropropyltrichlorosilane, 1.9 percent allyltrichlorosilane, 11.9 percent 1,3-trichlorosilyl propane, and 0.8 percent n-propyltrichlorosilane. The G value (3-chloropropyltrichlorosilane) for this reaction was 896.

Example 3

0.55 gram of allyl chloride and 4.05 grams of trichlorosilane were placed in a 20 cc. heavy-walled glass tube. The mixture was then heated to 135° C. and subjected to 0.91 megarads of Co-60 gamma radiation at a dosage rate of 0.168 megarad per hour. Vapor phase chromatograph and mass spectrometer analysis indicated a 76.5 percent conversion of allyl chloride yielding 63.6 percent 3-chloropropyltrichlorosilane, 5.4 percent allyltrichlorosilane, 6.8 percent 1,3-bis-trichlorosilyl propane, and 0.7 percent n-propyltrichlorosilane. The G value (3-chloropropyltrichlorosilane) for this reaction was 1080.

Example 4

0.56 gram of allyl chloride and 4.01 grams of trichlorosilane were placed in a 20 cc. heavy-walled glass tube. The mixture was then heated to 110° C. and subjected to 1.56 megarads of Co-60 gamma radiation at a dosage rate of 1.72 megarads per hour. Vapor phase chromatograph and mass spectrometer analysis indicated a 60.7 percent conversion of allyl chloride yielding 56.7 percent 3-chloropropyltrichlorosilane, 3.3 percent allyltrichlorosilane, and 0.7 percent 1,3-bis-trichlorosilyl propane. The G value (3-chloropropyltrichlorosilane) for this reaction was 565.

Example 5

0.60 gram of allyl chloride and 4.12 grams of trichlorosilane were placed in a 20 cc. heavy-walled glass tube. The mixture was then heated to 160° C. and subjected to 1.51 megarads of Co-60 gamma radiation at a dosage rate of 1.68 megarads per hour. Vapor phase chromatograph and mass spectrometer analysis indicated a 93.6 percent conversion of allyl chloride yielding 73.0 percent 3-chloropropyltrichlorosilane, 1.5 percent allyltrichlorosilane, 18.9 percent 1,3-bis-trichlorosilyl propane, and 0.2 percent n-propyltrichlorosilane. The G value (3-chloropropyltrichlorosilane) for this reaction was 770.

Example 6

The procedures of Example 5 were followed with the exception that the trichlorosilane and allyl chloirde were mixed in a mole ratio of 6:1, 8:1, and 10:1. Subsequent analysis provided equivalent results.

That which is claimed is:
1. A method of preparing 3-chloropropyltrichlorosilane comprising
   (A) mixing trichlorosilane and allyl chloride in a mole ratio of from 4:1 to 10:1,
   (B) heating said mixture to a temperature of from 110° C. to 160° C., and
   (C) radiating said mixture with ionizing radiation to induce a dosage of from 0.5 to 1.75 megarads.
2. The method as recited in claim 1 wherein the trichlorosilane and allyl chloride are mixed in a mole ratio of 4:1.
3. The method as recited in claim 2 wherein the mixture is heated to a temperature of from 130° C. to 140° C.
4. The method as recited in claim 3 wherein the mixture is ionized with radiation to induce a dosage of 1.0 megarads.
5. The method as recited in claim 4 wherein the source of ionizing radiation is gamma-irradiation from Co-60.
6. The method as recited in claim 1 wherein the trichlorosilane and allyl chloride are mixed in a mole ratio of 4:1, the mixture is heated to a temperature of 135° C., the mixture is ionized with radiation to induce a dosage of 1.0 megarads, and the source of ionizing radiation is gamma-irradiation from Co-60.

References Cited

UNITED STATES PATENTS 3,188,336   6/1965   Haszeldine _____ 204—158 X

OTHER REFERENCES

El-Abbady et al., J.A.C.S., 80 (1958) pp. 1737–39.

HOWARD S. WILLIAMS, *Primary Examiner.*